United States Patent

Madono et al.

[11] Patent Number: 6,066,851
[45] Date of Patent: May 23, 2000

[54] RADIATION DEEP DOSE MEASURING APPARATUS AND CORPUSCULAR BEAM DETECTOR

[75] Inventors: Kunio Madono; Eisaku Teratani; Kazunori Ikegami; Hiroshi Nishizawa; Satoshi Senoo, all of Tokyo, Japan

[73] Assignee: Mitsubishi Denki Kabushiki Kaisha, Tokyo, Japan

[21] Appl. No.: 08/974,552

[22] Filed: Nov. 19, 1997

[30] Foreign Application Priority Data

Nov. 21, 1996 [JP] Japan ................................. 8-311062

[51] Int. Cl.⁷ ..................................................... G01T 1/20
[52] U.S. Cl. ...................... 250/367; 250/368; 250/363.01
[58] Field of Search .............................. 250/363.01, 367, 250/368

[56] References Cited

U.S. PATENT DOCUMENTS

| | | | |
|---|---|---|---|
| 4,415,810 | 11/1983 | Brown, Sr. ............................... | 250/367 |
| 4,437,007 | 3/1984 | Koslow et al. ........................... | 250/366 |
| 4,538,071 | 8/1985 | Bardoux et al. ...................... | 250/505.1 |
| 4,823,016 | 4/1989 | Yamashita et al. ................. | 250/363.03 |
| 4,845,769 | 7/1989 | Burstein et al. ........................... | 378/58 |
| 5,006,714 | 4/1991 | Attix ....................................... | 250/368 |
| 5,281,820 | 1/1994 | Groh et al. ............................... | 250/368 |
| 5,308,988 | 5/1994 | Siedband .............................. | 250/385.1 |
| 5,391,879 | 2/1995 | Tran et al. .............................. | 250/367 |
| 5,420,959 | 5/1995 | Walker et al. ........................... | 385/143 |
| 5,430,308 | 7/1995 | Feichtner et al. ....................... | 250/580 |
| 5,627,367 | 5/1997 | Sofield ................................. | 250/252.1 |
| 5,675,151 | 10/1997 | Oka et al. ............................... | 250/368 |
| 5,780,856 | 7/1998 | Oka et al. ............................... | 250/367 |
| 5,905,263 | 5/1999 | Nishizawa et al. ...................... | 250/368 |

OTHER PUBLICATIONS

Aoyama et al., "Scintillating Fiber Depth–Dose Measuring Device for Electron Beam Therapy", Jun. 20, 1996 Partial English Translation.
Catalog of 240 type three dimensional computer control CIPS dose plotting system. Partial English Translation.
"Standard methods for measuring radiation doses", Feb. 28, 1986. Partial English Translation.

*Primary Examiner*—Constantine Hannaher
*Assistant Examiner*—Albert Gagliardi
*Attorney, Agent, or Firm*—Leydig, Voit & Mayer, Ltd.

[57] ABSTRACT

A radiation deep dose measuring apparatus. A corpuscular beam detector of scintillation fibers bundled together into a block is adjusted in position to have a width similar to the radiation range of corpuscular beams; a driving apparatus rotates the corpuscular beam detector and an image receiver together around a center corresponding to a radial axis of the beams; the image receiver captures the image of scintillation light emanating from the corpuscular beam detector; an image signal processing apparatus processes the image signal to produce the distribution of radiation doses as a function of depth; and a displaying apparatus displays the result. The radiation deep dose measuring apparatus allows rapid measurement of radiation doses in three-dimensional space.

14 Claims, 9 Drawing Sheets

236

237

238

RADIATION DEEP DOSE MEASURING APPARATUS AND CORPUSCULAR BEAM DETECTOR

BACKGROUND OF THE INVENTION

1. Field of the Invention

This invention relates to an apparatus for rapidly determining the distribution of radiation doses in the deeper parts of a body which will be helpful when an optimum operating condition is sought for a cancer therapy machine radiating corpuscular beams such as electron beams, or X-rays onto a lesion, and to a detector for detecting such corpuscular beams.

2. Description of the Related Arts

FIG. 14 is a diagram illustrating a conventional deep dose radiation measuring apparatus which determines the distribution of radiation doses in the deeper parts of a body. The conventional radiation deep dose measuring apparatus consists of an ionization box 102 placed in a water phantom 107, and the measurement is achieved with the ionization box 102 which measures the ionization level at a point and converts it into an absorbed amount of radiation. The ionization box 102 is driven, as shown by arrows in the same figure, in the direction of depth (upward or downward) or in a direction (anteroposterior or lateral directions) normal to the axis of corpuscular beams 101 in the water phantom 107, with a driving apparatus 104 and a control system 105. The dose-at-depth measuring apparatus determines the distribution of radiation doses in the water phantom 107.

The conventional radiation deep dose measuring apparatus has a constitution as described above, and its use consists of following procedures: a corpuscular beam 101 ionizes air in the ionization box 102 placed within the water phantom 107, the amount of ionization is amplified with an amplifier 103 for quantification, and the measurement is displayed on a displaying apparatus 106 to represent the distribution of radiation doses. To determine the distribution of radiation doses in the water phantom, the ionization box 102 is moved along X, Y, and Z-axes of a coordinate system assumed in the water phantom 107, and each time the ionization box is moved along one axis, the ionization in the ionization box 102 is determined.

For the conventional radiation deep dose measuring apparatus with such constitution to determine the distribution of radiation doses at depth, it is necessary to move the ionization box 102 placed within the water phantom 107 whenever measurement is undertaken, and thus the measurement with this apparatus requires much time and energy.

Further, to get the distribution of radiation doses in a three dimensional (3D) space, it is necessary to move the ionization box along the three coordinate axes including X-, Y-, and Z-axes one after another, which requires enormous time and energy, too.

Furthermore, if, during measurement, the output of corpuscular beams such as electron beams, or X-rays, (not illustrated here) undergoes fluctuations, the measurement must be renewed to obtain a reliable result of the distribution of radiation deep dose, which also requires much energy and troubles.

Still further, if the ionization box 102 is enlarged to shorten the time necessary for the measurement of doses at depth, the measurement range of one stroke of measurement will be enlarged, but the measurement will be impaired in precision, and the dose measurement along each of the coordinate axes of the water phantom 107 will be reduced in resolution, which will hamper the exact determination of the distribution of doses at depth.

This invention is proposed as a remedy for those problems described above, and intends to provide a radiation deep dose measuring apparatus with a detector measuring radiation doses in a wide range at one stroke with a high resolution which will make it possible to determine the distribution of radiation doses at depth rapidly and with a high precision by moving the detector.

SUMMARY OF THE INVENTION

The radiation deep dose measuring apparatus according to the present invention comprises: a corpuscular bean detector wherein a scintillator having radiation absorbing properties similar to biological tissues emits light when exposed to corpuscular beams; a image receiver which receives the optical image emitted by the corpuscular beam detector; a measuring means which measures the distribution of radiation doses of corpuscular beams on a two-dimension plane corresponding to the surface of the corpuscular beam detector based on signals from the image receiver; and a moving means which moves the corpuscular beam detector and the image receiver as a unit, and which determines the three-dimensional distribution of radiation doses within the range illuminated by the corpuscular beams by moving the corpuscular beam detector and the image receiver using the moving means.

Further, the corpuscular beam detector according to the present invention comprises: a main block composed of a material having radiation absorbing properties similar to biological tissues which also reflects light said block being formed with a plurality of holes; liquid scintillators having radiation absorbing properties similar to biological tissues fulled into the holes; and a transparent material having radiation absorbing propertis similar to biological tissues coverring the holes.

Furthermore, the corpuscular beam detector according to the present invention comprises: a main block which is composed of a material having radiation absorbing properties similar to biological tissues formed with a plurality of holes and; and scintillation fibers having radiation absorbing properties similar to biological tissues inserted into the holes.

DESCRIPTION OF THE PREFERRED EMBODIMENTS

Embodiment 1

The preferred embodiments of this invention will be described below with reference to attached figures.

Figure 1:
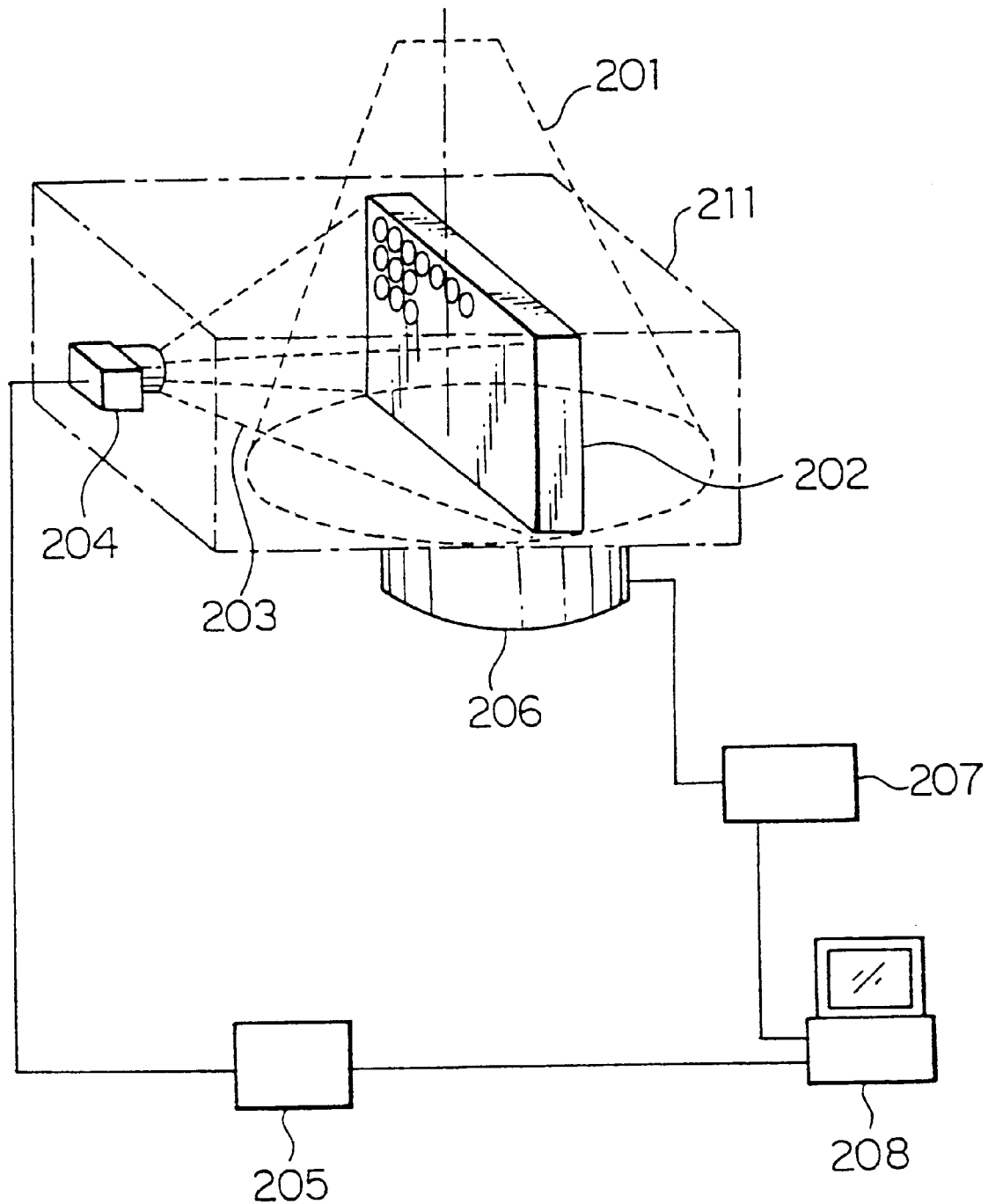
FIG. 1 is a schematic view of the radiation deep dose measuring apparatus of Embodiment 1 of this invention.

FIG. 1 is a schematic view of the radiation deep dose measuring apparatus of Embodiment 1 of this invention.

In the figure, 201 represents corpuscular beams such as electrons, X-rays, protons, heavy particles, etc., emanating from a corpuscular beam radiator (not illustrated here). 202 represents a corpuscular beam detector which comprises a bundle of scintillation fibers, for example, scintillation fibers with a diameter of 1 mm bonded together with an adhesive into a block. This corpuscular beam detector 202 has radiation absorbing properties similar to biological tissues. In addition, the corpuscular beam detector 202 has a width sufficiently large to cover the range over which the corpuscular beams 201 spread (range necessary for a measurement).

A flux of light 203 emanates from the corpuscular beam detector 202 when corpuscular beams 201 are incident on the detector 202, towards a image receiver 204 which may be a CCD camera.

An image signal processing means 205 is a means to determine the distribution of radiation doses of corpuscular beams 201 on a two dimensional plane corresponding to an extension of corpuscular beam detector 202 from the signals received by the image receiver 204. A light shielding box 211 encloses the corpuscular beam detector 202 and the image receiver 204. A driving apparatus 206 is placed beneath the box 211, and incorporates a motor to rotate the corpuscular beam detector 202 and the image receiver 204 together. A control system 207 controls the driving apparatus 206. A displaying apparatus 208 displays the light distribution provided by the image signal processing means 205, that is, displays the distribution of radiation doses of corpuscular beams 201.

Now, operation of the apparatus will be explained.

Corpuscular beams 201 radiated from a corpuscular beam radiator are incident upon the corpuscular beam detector 202, and light generated in the interior of corpuscular beam detector 202. The light generated in the interior of the corpuscular beam detector 202, with radiation absorbing properties similar to biological tissues, reaches the proximal end of the corpuscular beam detector 202 to form a light image. The image, or a flux of light 203 responsible for the formation of the image, is received by the image receiver 204. The light received by the image receiver 204 is converted into electrical signals which are then sent to the image signal processing means 205. The image signal processing means 205 processes the signals and computes the parameters from them necessary for acquisition of the distribution of radiation doses, and the result is displayed on the displaying apparatus 208. Further, the result is stored in the memory of displaying apparatus 208.

The driving apparatus 206 rotates the corpuscular beam detector 202 and the image receiver 204 by a specified angle at one time, and, for each stepwise rotation, the above process is repeated. Through this operation, the distribution of corpuscular beams 201 absorbed in a two-dimensional space occupied by the corpuscular beam detector 202 is obtained. This operation is repeated until the corpuscular beam detector 202 and image receiver 204 is rotated by 180°. At this moment, the distribution results of individual planes which are separated from each other by the specified angle are integrated, and the distribution of radiation doses in 3D space and exposed to the radiation of the corpuscular beams 201 can be obtained.

In contrast with the conventional apparatus where the radiation dose is measured at one spot at one time, the apparatus of this invention allows one to determine the distribution of radiation doses in one plane at one time, and thus to obtain the distribution of radiation doses in 3D space in a shorter time. In short, this apparatus allows a rapid and exact determination of the distribution of radiation doses by depth.

Further, the corpuscular beam detector 202 and image receiver 204 are rotated to scan the space under study, which serves to economize the space necessary for the location of apparatus.

The corpuscular beam detector 202 does not always have the same width as the radiating beams (range necessary for measurement), but may have a width larger than the latter.

Embodiment 2

Figure 2:
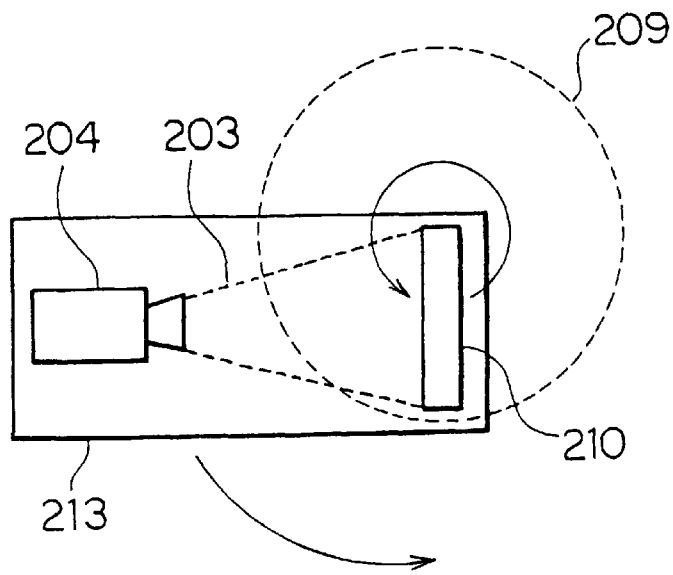
FIG. 2 is a schematic view of the radiation deep dose measuring apparatus of Embodiment 2 of this invention.

FIG. 2 is a schematic view of the radiation deep dose measuring apparatus of Embodiment 2 of this invention, and is a plan view of the same apparatus.

In the figure, the elements having the similar function corresponding to Embodiment 1 are represented by the same symbol, and description of them will be omitted.

This embodiment is different from Embodiment 1 in that a corpuscular beam detector 210 has a width half that of the corpuscular beam detector 202 of Embodiment 1, and that the corpuscular beam detector 210 and image receiver 204 are together rotated to 360° by a driving means 213 with a center at one end of the width of the beam detector 210 within the radiation range 209 of corpuscular beams 201 (range necessary for measurement).

In the radiation deep dose measuring apparatus with this constitution, by rotating the corpuscular beam detector 210 and image receiver 204 together, can obtain the distribution of radiation doses in 3D space rapidly and precisely.

Further, as the corpuscular beam detector 210 and image receiver 204 are driven to turn around a center, the radiation deep dose measuring apparatus incorporating those elements does not require a wide space for installation, and as the corpuscular beam detector 210 is reduced in bulk to half that of Embodiment 1, the measuring apparatus can be more easily transported. These features contribute to greatly reduce the cost. Further, the apparatus can be reduced in size which also serves to reduce the cost.

The corpuscular beam detector 210 does not always have a width half that of the corpuscular beam detector 202 of Embodiment 1, but may have a width larger than the latter.

Embodiment 3

Figure 3:
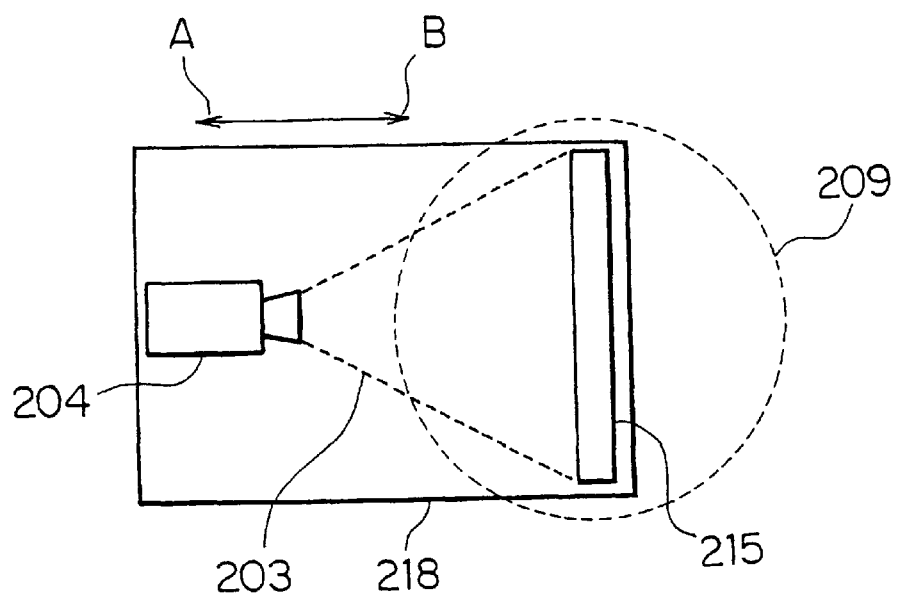
FIG. 3 is a schematic view of the radiation deep dose measuring apparatus of Embodiment 3 of this invention.

FIG. 3 is a schematic view of the radiation deep dose measuring apparatus of Embodiment 3 of this invention, and is a plan view of the same apparatus.

This embodiment, as seen from FIG. 3, is different from Embodiment 1 in that a driving apparatus 218 to act as a driving means for moving in fore, aft, and horizontal directions drives a corpuscular beam detector 215 and the image receiver 204 together so that they may slide in the direction normal to the axis passing through the center of radiation range 209 of corpuscular beams 201, and in the direction parallel to the thickness of the detector 215 (as represented by arrows A and B).

The corpuscular beam detector 215 has a width sufficiently large to cover the radiation range (sufficiently large range necessary for proper measurement) in the same manner as in Embodiment 1 shown in FIG. 1.

The radiation deep dose measuring apparatus with this constitution, by sliding the corpuscular beam detector 215 back and forth, can obtain the distribution of radiation doses on a plane rapidly like Embodiment 1, thereby to obtain the precise distribution of radiation doses in 3D space.

The corpuscular beam detector 215 does not always have a width the same as that of the radiation range, but may have a width larger than that. For the latter case, however, the involved cost will be increased.

Embodiment 4

Figure 4:
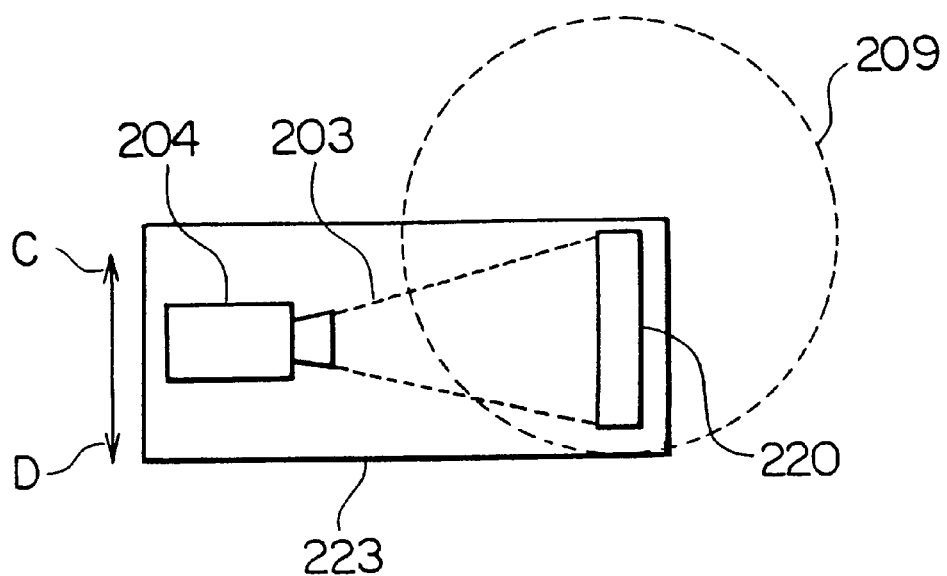
FIG. 4 is a schematic view of the radiation deep dose measuring apparatus of Embodiment 4 of this invention.

FIG. 4 is a schematic view of the radiation deep dose measuring apparatus of Embodiment 4 of this invention, and is a plan view of the same apparatus.

This embodiment, as seen from FIG. 4, is different from Embodiment 1 in that a corpuscular beam detector 220 is contracted to have a width half that of the corresponding detector 202 of Embodiment 1, and that a driving apparatus 223 for driving in right, left, and horizontal directions drives the corpuscular beam detector 220 and the image receiver 204 together so that they may slide in the direction normal to the central axis of radiation range 209 of corpuscular beams, and in the direction parallel to the width of the detector 220 (as represented by arrows C and D).

The radiation deep dose measuring apparatus with this constitution, by sliding in the direction as represented by the arrows C and D the corpuscular beam detector 220 and image receiver 204 together by the use of the driving apparatus 223 to move in right, left, and horizontal directions, can obtain the distribution of radiation doses rapidly and precisely.

Further, as the corpuscular beam detector 220 is reduced in weight to half that of Embodiment 1, the measuring apparatus of this embodiment can be more easily transported. As the corpuscular beam detector 220 which requires a high cost for production can be reduced in bulk to half that of Embodiment 1, it allows a great reduction in cost. Furthermore, the apparatus itself can be reduced in size which also serves to reduce the cost.

In this embodiment, the corpuscular beam detector 220 does not move in fore and aft directions, but moves only in lateral directions, and thus this apparatus can be applied only to the patient in whom the radiation range of corpuscular beams 201 to be applied to a lesion is within the moving range of the corpuscular beam detector 220.

The corpuscular beam detector 220 does not always have a width half that of the corresponding detector 202 of Embodiment 1, but may have a width larger than that.

Embodiment 5

Figure 5:
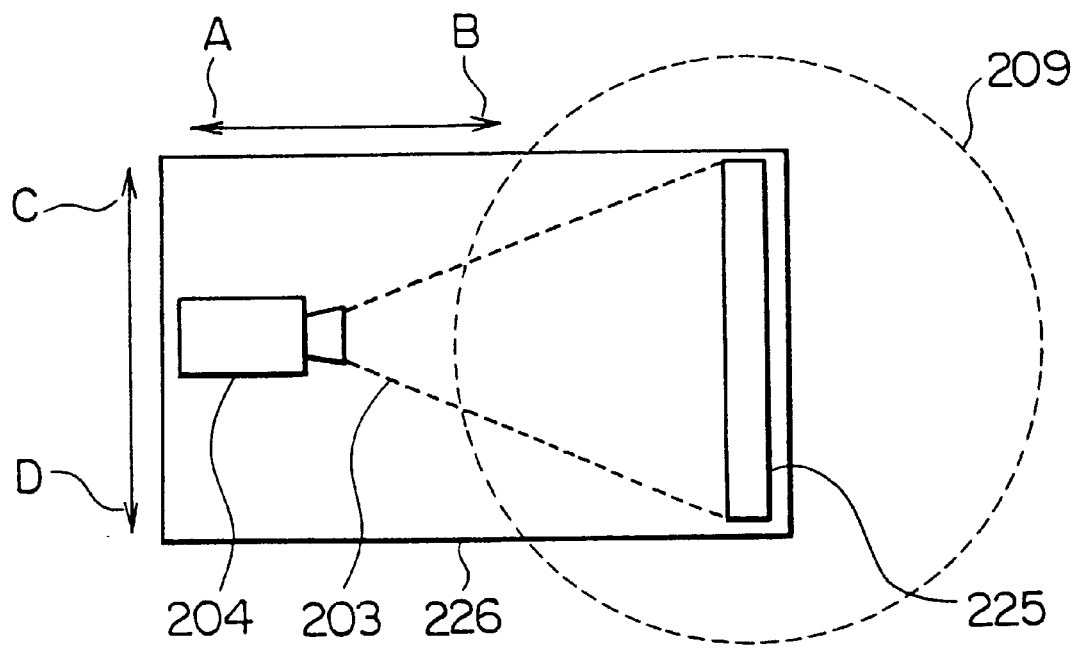
FIG. 5 is a schematic view of the radiation deep dose measuring apparatus of Embodiment 5 of this invention.

FIG. 5 is a schematic view of the radiation deep dose measuring apparatus of Embodiment 5 of this invention, and is a plan view of the same apparatus.

This embodiment, as seen from FIG. 5, is different from Embodiment 1 in that a corpuscular beam detector 225 is contracted to have a width half that of the corresponding detector 202 of Embodiment 1, and that a driving apparatus 226 driving means in anteroposterior, right, left, and horizontal directions, drives the corpuscular beam detector 225 and image receiver 204 together so that they may slide in the direction normal to the central axis of radiation range 209 of corpuscular beams, and in the direction parallel to the thickness (arrows A and B) and to the width (arrows C and D) of the detector 225.

In the radiation deep dose measuring apparatus with this constitution, by sliding the corpuscular beam detector 225 and image receiver 204 together, parallel to the thickness and width of the detector 225, can cover the total radiation area of corpuscular beams (range necessary for the measurement) in a short time, and thus obtain a distribution of radiation doses in 3D space rapidly and precisely.

Further, as the corpuscular beam detector 225 is reduced in weight to half that of the corresponding detector 202 of Embodiment 1, the measuring apparatus of this embodiment can be more easily transported. As the corpuscular beam detector 225 which requires a high cost for production can be reduced in bulk to half that of the corresponding detector 202 of Embodiment 1, it allows a great reduction in cost. Furthermore, the apparatus itself can be reduced in size which also serves to reduce the cost.

The corpuscular beam detector 225 does not always have a width half that of the corresponding detector 202 of Embodiment 1, but may have a width larger than that.

Embodiment 6

As regards Embodiments 1 and 2 which incorporate a driving apparatus to rotate the corpuscular beam detector and image receiver together in circles, if it is possible to move the detector in directions parallel to the width and thickness of the detector, in addition to circles, it will be possible to obtain the distribution of radiation doses through the rotation of detector, linear movement of the detector, or a combination of both movements.

Further, as regards Embodiments 1 to 5, if the apparatus is constructed so the corpuscular beam detector moves in directions parallel to the radial axis of corpuscular beams 201 or in directions parallel to the height of the detector, it will be very convenient.

Furthermore, in Embodiments 1 to 5, the scintillation fibers of the corpuscular beam detector are so placed as to dispose their axes normal to the radial axis of corpuscular beams 201 as seen from FIG. 1. It is not always necessary, however, that the scintillation fibers be disposed with their axes normal to the radial axis, but they may be disposed at any desired angle with respect to the radial axis.

Embodiment 7

Figure 6:
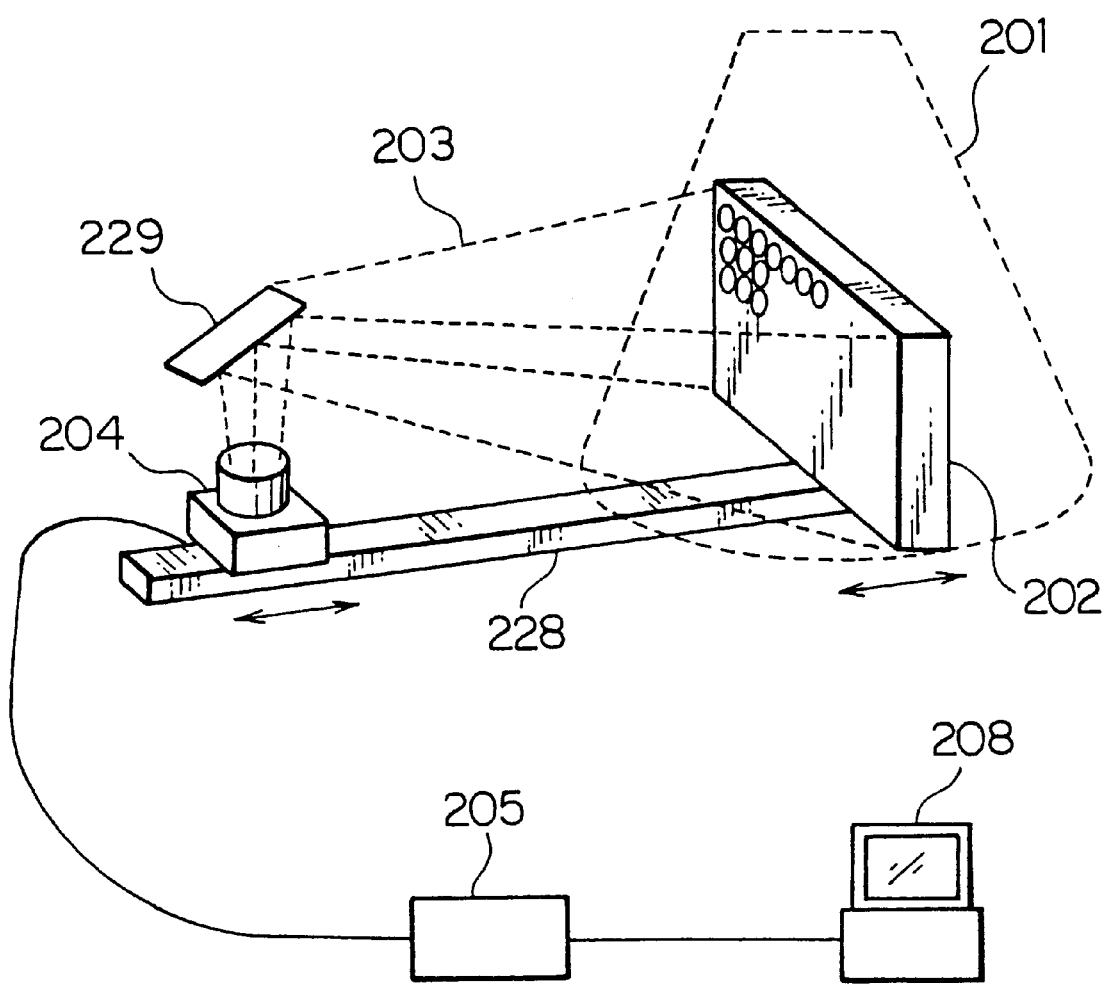
FIG. 6 is a schematic view of the radiation deep dose measuring apparatus of Embodiment 6 of this invention.

FIG. 6 is a schematic view of the radiation deep dose measuring apparatus of Embodiment 7 of this invention.

This embodiment, as seen from FIG. 6, is different from Embodiment 1 in that an image reflector 229 as a reflecting member is inserted between the corpuscular beam detector 202 and the image receiver 204.

The radiation deep dose measuring apparatus with this constitution, by incorporating the image reflector 229, can shorten the distance between the corpuscular beam detector 202 and the image receiver 204, and thus its total length is also contracted. Therefore, this radiation deep dose measuring apparatus can be more easily transported. Such apparatus does not require a wide space for installation. Further, the box which corresponds with the box 211 of Embodiment 1 but is not illustrated in FIG. 6 can have a smaller volume.

This image reflector 229 may also be incorporated in all of Embodiments 1 to 5.

A rail 228 in FIG. 6 guides the movement of corpuscular beam detector 202 and the image receiver 204, and thus the corpuscular beam detector 202 and the image receiver 204 can slide along the rail 228 independently of each other in a direction parallel to the thickness of detector 207, and can be fixed at any desired position on the rail 228 with appropriate means which are not illustrated in the figure. As this embodiment incorporates the rail 228 as a position adjustment means, the corpuscular beam detector 202 and the iamge receiver 204 can be easily and finely adjusted in their positions. The distance between the detector 202 and the image receiver 204 can be easily adjusted, too.

The position adjustment means may also be applied to Embodiments 1 to 5 when they are devoid of the image reflector 229.

Embodiment 8

Figure 7:
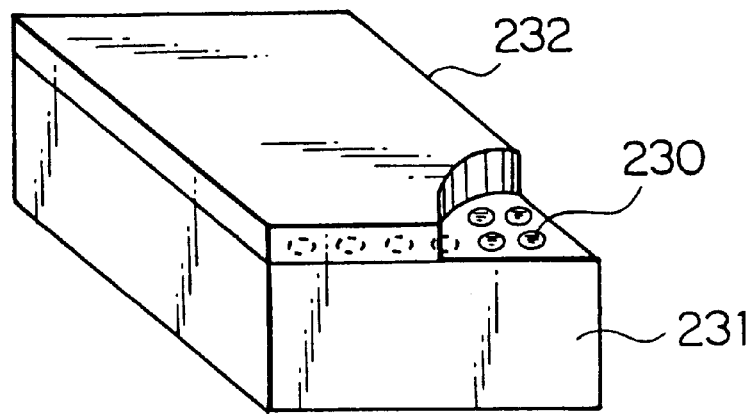
FIG. 7 is a schematic view of the radiation deep dose measuring apparatus of Embodiment 8 of this invention.

FIG. 7 shows the corpuscular beam detector of a radiation deep dose measuring apparatus of Embodiment 8 of this invention. In this figure, a white plastic block 231 constitutes a main block and is produced after a mesh comprising 1×1 mm unit squares has been prepared on its surface. A cylindrical hole opened at each unit square, a liquid scintillator 230 poured into the hole, and a transparent plastic block 232 as a transparent member applied over the array of holes containing liquid scintillators. As the liquid scintillator 230 and white plastic block 231 have different refraction indices, light incident upon the interface is refracted. When corpuscular beams 201 are incident upon each of scintillators 230, light is generated in each of the scintillators 230 and is transmitted to the end of the relevant corpuscular beam detector where, individual lights elements, together, from an image.

The liquid scintillator 230 may be employed because it has radiation absorbing properties similar to biological tissues, and the white plastic block 231 and transparent plastic block 232 may be employed because they also have a radiation absorbing property similar to biological tissues. The plastic blocks 231 and 232 may be, for example, an acrylic. The liquid scintillator may be a solvent, such as toluene, containing a dissolved organic scintillator, such as p-terphenyl or diphenyloxazol.

Any other materials than plastics may be used, as long as they have radiation absorbing properties similar to biological tissues.

A modified version of Embodiment 8 includes a corpuscular beam detector wherein the transparent plastic block 232 has a larger thickness to improve electron equilibrium. Electron equilibrium will be described later with reference to Embodiment 9.

Instead of the transparent plastic block 232 which covers the whole array of holes, a plastic lid may be applied to each hole opened on the white plastic block 231 and containing the liquid scintillator 230. When it has a large thickness, its electron equilibrium will be improved.

Further, the white plastic block 231 constituting the main block reflects fluorescence generated in a given liquid scintillator 230 within that scintillator, and prevents (shielding light leakage) light leakage between adjacent liquid scintillators 230. The block in question may be made of any material as long as it can reflect light other than white light, and has radiation absorbing properties similar to biological tissues.

The radiation deep dose measuring apparatus with this constitution includes the white plastic block 231 in which holes can be precisely drilled with a specified separation from each other. Therefore the parts of the corpuscular beam detector where corpuscular beam radiation is converted into light are more precisely placed with respect to each other, which allows a more precise and higher resolution determination of the distribution of doses as a function of depth. Further, this arrangement does not require a special technique for its preparation which also serves to reduce production cost.

Embodiment 9

Figure 8:
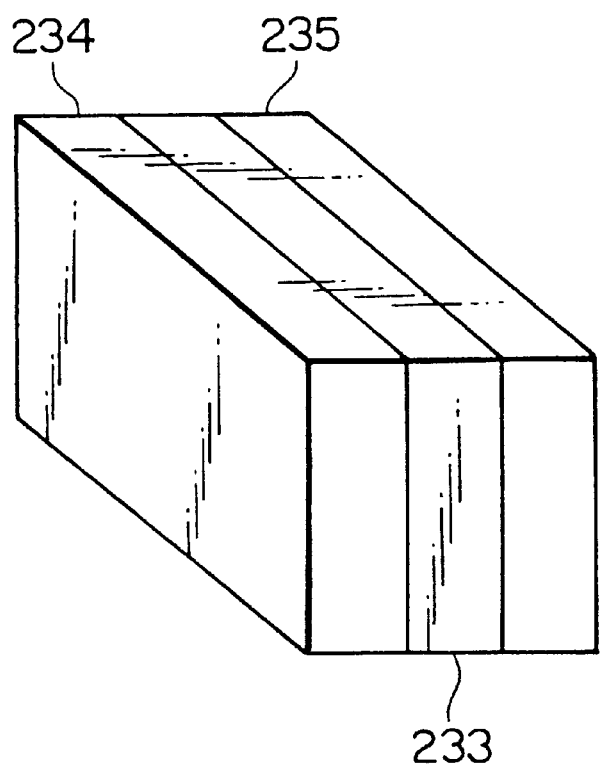
FIG. 8 is a schematic view of the radiation deep dose measuring apparatus of Embodiment 9 of this invention.

FIG. 8 shows the corpuscular beam detector of a radiation deep dose measuring apparatus of Embodiment 9 of this invention. As seen from the figure, the detector comprises a scintillation fiber block 233, such as the beam detector 202 in FIG. 1, that has been inserted between transparent plastic blocks 234 and 235 so as to keep electron equilibrium balanced.

Let's assume that the scintillation fiber block has a thickness of 50 mm. Then, the transparent plastic blocks 234 and 235 preferably have a thickness the same as or more than above thickness.

Here description will be given about electron equilibrium. If the corpuscular beam detector consists of the scintillation fiber block 233 alone, it can have a smaller thickness than the actual detector with a three layered structure. However, when such detector is applied on a human body lying on a bed, the human body has a thickness parallel to the thickness of detector. Accordingly, the dispersion of corpuscular beams 201 is different according to the depth at which it is measured. By contrast, if the scintillation fiber block 233 is sandwiched from front and behind by the plastic blocks 234 and 235, it becomes equivalent to biological tissues, and thus allows an exact measurement of radiation doses, in this case, in the human body.

The scintillation fiber block 233, when sandwiched at front and behind by transparent plastic blocks 234 and 235, can be smaller in thickness than the same block alone, and thus it may reduce the cost.

This is because, as the transparent plastic blocks 234 and 235 have radiation absorbing properties similar to biological tissues, the scintillation fiber block 233, even if having a small thickness, can achieve an exact measurement of radiation doses in the human body.

To put it otherwise, when the corpuscular beam detector consists of a scintillation fiber block 233 sandwiched between plastic blocks, instead of being constituted only of a scintillation fiber block 233, a part of expensive scintillation fiber block 233 can be replaced with cheap plastic blocks.

The radiation deep dose measuring apparatus with this constitution allows the production cost to be reduced, because the work involved in sandwiching the scintillation fiber block at front and behind between the two transparent plastic blocks is easy, and such scintillation fiber block can have a smaller thickness than the fiber block alone.

Further, as the end of scintillation fibers is not directly exposed on the surface, it can be easily wiped clean even if soiled through the contact with dirty fingers, and thus passage of light through the scintillation fiber is not impaired. Furthermore, adherence of dusts to the end of scintillation fibers can be wiped away to maintain the transparency of those scintillation fibers.

A modified version of Embodiment 9 has the following constitution: the transparent plastic block 235 applied to the scintillation fiber block 233 on the surface opposite to the surface facing the image receiver 204 is replaced with a white plastic block to act as a reflection block. As the white plastic block can reflect light, it can also reflect light generated in the scintillation fibers, thereby establishing electron equilibrium.

As another modified version of Embodiment 9, the above modification may be applied to the corpuscular beam detector incorporating liquid scintillators which is depicted in FIG. 7 as Embodiment 8. In this case, the transparent plastic block may be thin.

Further, the white plastic block 231 may be thin in the parts which span the length from the bottom of holes to the rear surface of the block.

Embodiment 10

Figure 9:
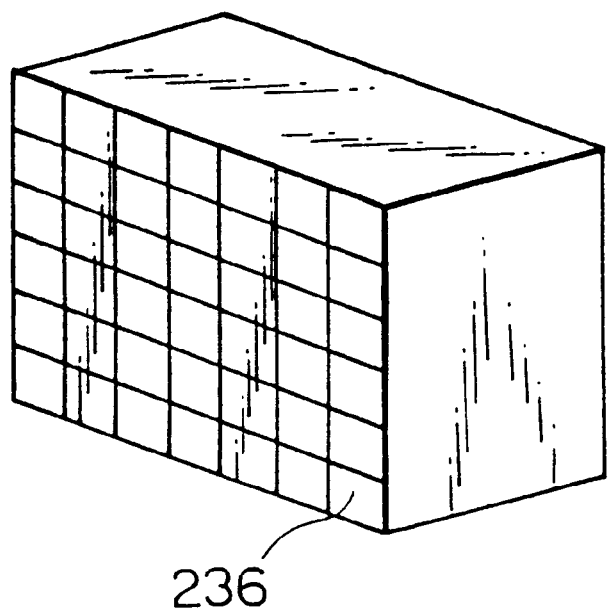
FIG. 9 is a schematic view of the radiation deep dose measuring apparatus of Embodiment 10 of this invention.

FIG. 9 shows the corpuscular beam detector of a radiation deep dose measuring apparatus of Embodiment 10 of this invention. As seen from the figure, the detector is produced after scintillation fibers 236 have been bundled together into a fiber block on whose cross-section the contours of fibers form a grid. In this embodiment, square-shaped scintillation fibers 236 each are bonded together with an adhesive made of an opaque synthetic resin into a square block whose cross-section forms a grid.

The unitary scintillation fiber may have a rectangular cross-section, instead of square cross-section.

The deep dose measuring apparatus with this constitution, by incorporating scintillation fibers with a square or rectangular cross-section, and thus having a square or rectangular cross-section itself, gives precisely the same dimension as initially designed after the unitary scintillation fibers have been assembled, and thus allows a high resolution measurement which enables one to exactly determine the distribution of radiation doses as a function of depth.

The unitary scintillation fibers can be more easily assembled, complying with the dimension originally designed, than is possible with production of a detector which incorporates scintillation fibers with circular cross-sections, and thus the production cost of the detector can be reduced.

As a modified version of Embodiment 10, the detector may be sandwiched between transparent plastic blocks 234 and 235 (or the plastic block attached to the side opposite to the side facing the photosensitive unit 204 may be a white plastic block) like Embodiment 9 shown in FIG. 8.

When the detector is allowed to have such structure, its electron equilibrium will be improved, and the unitary scintillation fibers 236 with a square or rectangular cross-section can be reduced in length, all of which will contribute to reduction of the cost.

Embodiment 11

Figure 10:
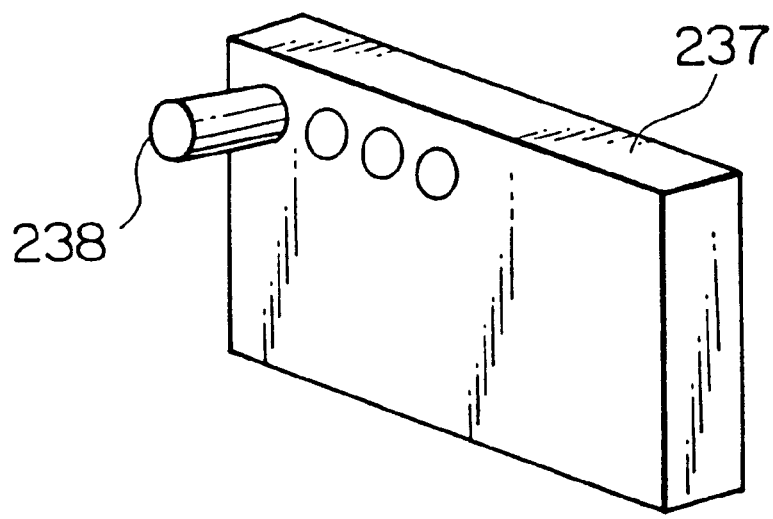
FIG. 10 is a schematic view of the radiation deep dose measuring apparatus of Embodiment 11 of this invention.

FIG. 10 shows the corpuscular beam detector of a radiation deep dose measuring apparatus of Embodiment 11 of this invention. As seen from the figure, the detector is produced after cylindrical holes (penetrating holes) are opened through a white plastic block 237 to act as a reflection block. An array of holes therein has centers space 1 mm apart from one another, and a scintillator with a circular cross-section has been inserted into each hole.

The deep dose measuring apparatus with this constitution allows each hole to be opened precisely according to an original design. Thus, those holes are positioned exactly to improve the resolution of the detector, which enables one to exactly determine the distribution of radiation doses as a function of depth.

Production of the detector with above constitution is easier as compared with the detector which is produced after individual scintillation fibers have been assembled through bonding with an adhesive, which will contribute to reduction of the cost.

The white plastic block 237 is to reflect light generated in scintillation fibers 238 within those scintillators, and to prevent (to shield leaks of light) leaks of light between adjacent scintillation fibers 236. The block in question may be made of any material as long as it is made of a material having a color other than white, and has radiation absorbing properties similar to biological tissues.

The hole (penetrating hole) to be opened through the white plastic block 237 may be a dead-end hole. In this case, if the distance from the bottom of holes to the rear surface of the white block is made large, the resulting electron equilibrium will be improved.

As a modified version of Embodiment 11, the detector may be sandwiched between transparent plastic blocks 234 and 235 (or the plastic block attached to the side opposite to the side facing the image receiver 204 may be a white plastic block) like Embodiment 9 shown in FIG. 8.

When the detector has such a structure, its electron equilibrium will be improved, and the unitary scintillation fibers 238 with a circular cross-section can be reduced in length, all of which will contribute to reduction of the cost.

Embodiment 12

Figure 11:
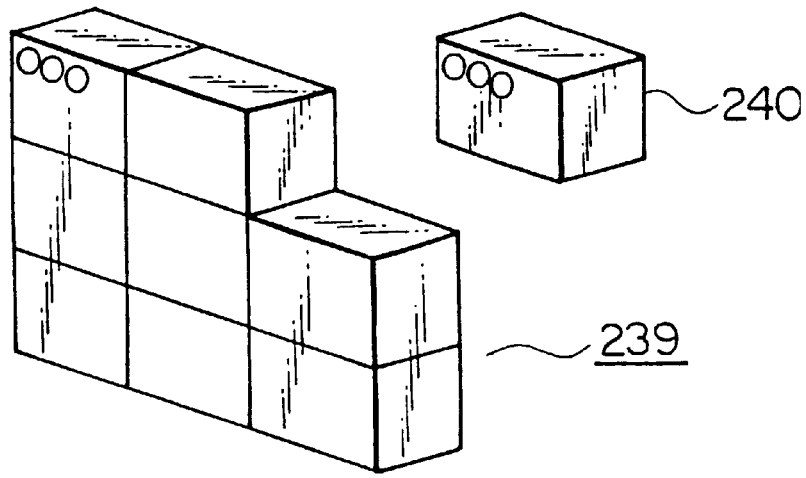
FIG. 11 is a schematic view of the radiation deep dose measuring apparatus of Embodiment 12 of this invention.

FIG. 11 shows the corpuscular beam detector 239 of a radiation deep dose measuring apparatus of Embodiment 12 of this invention.

As seen from the figure, a small detector unit 240 is a compact unit constituting a main scintillation fiber block, and is produced after the scintillation fiber block (corpuscular beam detector 202) like the one of Embodiment 1 shown in FIG. 1 has been divided into a number of smaller blocks.

Those detector 239 units are assembled together and fixed with appropriate means such as braces which are not illustrated in the figure.

The deep dose measuring apparatus with this constitution will have a long life for the following reason. When the detector has been exposed to corpuscular beams 201 for a long time, the central portion of the detector 229 becomes deteriorated earlier. Then, the deteriorated detector units at the center are moved to the periphery to replace the detector units there so that they may receive less radiation of corpuscular beams 201. As this apparatus can have a long life when properly cared for, the cost per one small detector unit 240 will be reduced.

As the small detector unit is light in weight, handling of the apparatus will become easy.

Embodiment 12 may be produced after the corpuscular beam detector of any one of Embodiments 8 to 11 has been divided into smaller units, and assembled.

Embodiment 13

Figure 12:
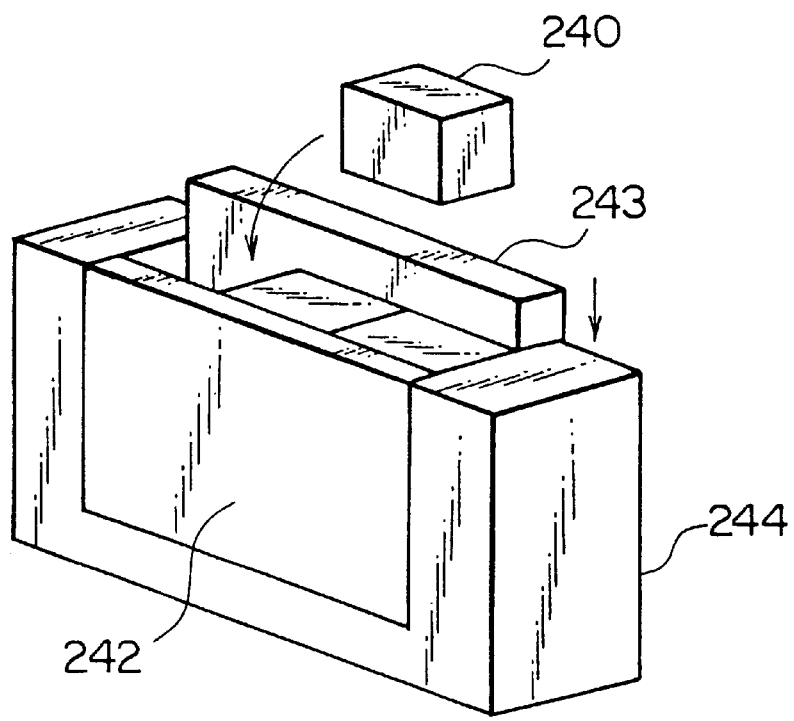
FIG. 12 is a schematic view of the radiation deep dose measuring apparatus of Embodiment 13 of this invention.

FIG. 12 shows the corpuscular beam detector of a radiation deep dose measuring apparatus of Embodiment 13 of this invention.

As seen from the figure, on the front surface of small detector units 240 of Embodiment 12 (the surface facing the photosensitive unit 204) is placed a transparent plastic panel 242 while on the rear surface is placed a white plastic panel 243 which reflects light transmitted towards the surface opposite to the one facing the photosensitive unit 204. Small detector units 240 are placed, being sandwiched between the transparent plastic panel 242 and white plastic panel 243, into a detector unit storing box 244.

The deep dose measuring apparatus with this constitution allows small detector units 240 to come into close contact with each other, corpuscular beams 201 to spread evenly over the detector surface, and thus to exactly determine the distribution of radiation doses as a function of depth. In addition, as the light surface is not accessible to human touch, handling of the apparatus will be easier.

The deep dose measuring apparatus of this Embodiment will have a long life for the same reason as in Embodiment 12. When the detector has been exposed to corpuscular beams 201 for a long time, the central portion of the detector becomes deteriorated earlier. Then, the deteriorated detector units 240 at the center are moved to the periphery to replace the detector units there so that they may receive less radiation of corpuscular beams 201.

When the detector contains the transparent plastic block 242 and white plastic block 243 as a reflection block, its electron equilibrium will be improved.

Embodiment 14

Figure 13:
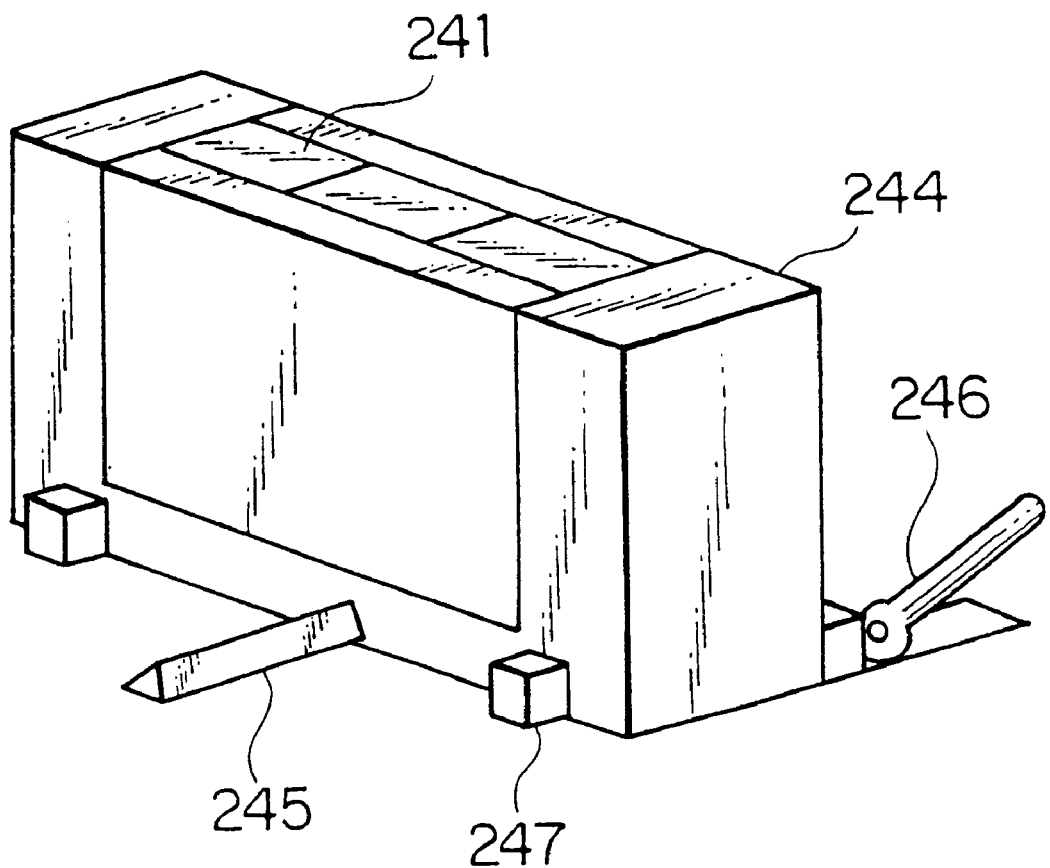
FIG. 13 is a schematic view of the radiation deep dose measuring apparatus of Embodiment 14 of this invention.
Figure 14:
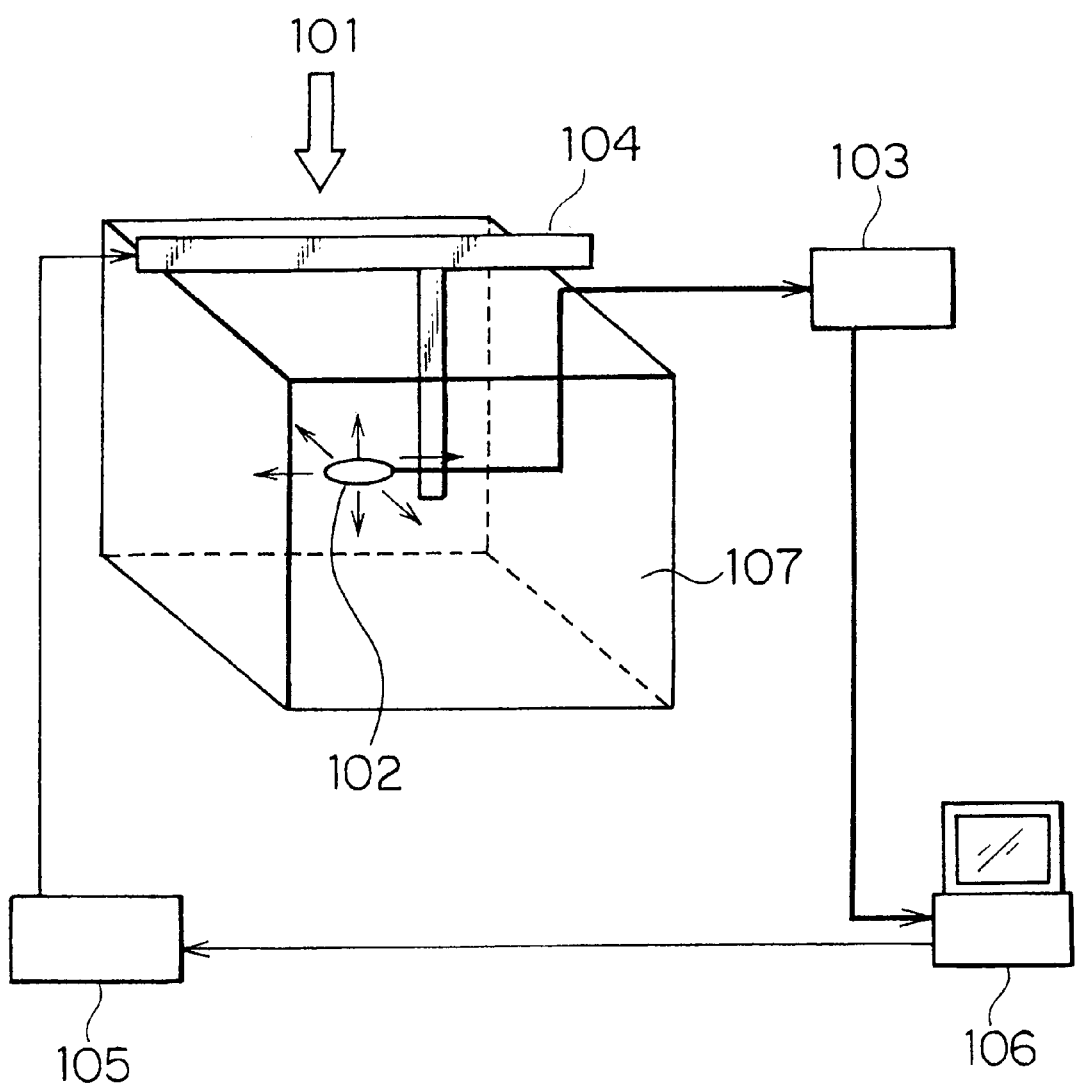
FIG. 14 is a schematic view of a conventional radiation deep dose measuring apparatus.

FIG. 13 shows the corpuscular beam detector of a radiation deep dose measuring apparatus of Embodiment 14 of this invention.

As seen from the figure, the detector storing box 244 has a groove inscribed at the center of bottom surface, a platform (not illustrated here) on which the detector has been mounted has a positioning guide 245, four stoppers for positioning, and a latch 246 with a handle.

The detector storing box 244 is properly placed at the center of the platform by putting the groove inscribed on the central bottom fittingly into the guide 244, is adjusted appropriately along the anteroposterior axis, and is fastened there with the positioning stoppers 247, and firmly stabilized to the platform with the latch 246 with a handle.

The deep dose measuring apparatus with this constitution makes positioning of the detector easy, because it requires only one trial for the proper fixation of the detector. This improves handing of the apparatus, and further as the apparatus is resistant to mechanical vibrations from external sources, it allows one to exactly determine the distribution of radiation doses as a function of depth.

Embodiment 15

The corpuscular beam detectors of Embodiments 8 to 14 described above are incorporated into the radiation deep dose measuring apparatus, but they, as a means to detect corpuscular beams, may be used for other purposes.

What is claimed is:

1. A radiation deep dose measuring apparatus comprising:
    a two-dimensional corpuscular beam detector including an array of scintillators, each scintillator having radiation absorbing properties similar to biological tissue and emitting light when exposed to a corpuscular beam, for forming a two-dimensional optical image representing a two-dimensional radiation dosage distribution of the corpuscular beam;
    an image receiver detecting the two-dimensional optical image emitted by said array of scintillators of said corpuscular beam detector and, in response, producing electrical signals representing the two-dimensional image;
    measuring means for measuring the radiation dosage distribution of the corpuscular beam in a two-dimensional plane corresponding to a surface of said corpuscular beam detector, based on the electrical signals representing the two-dimensional image produced by said image receiver; and
    moving means for moving said corpuscular beam detector and said image receiver together as a unit, relative to the corpuscular beam, for determining a three-dimensional radiation dosage distribution of the corpuscular beam.

2. The radiation deep dose measuring apparatus as described in claim 1 wherein said moving means rotates said corpuscular beam detector and said image receiver by at least 180° about a center corresponding to an extension of a radial axis of the corpuscular beam passing through a center of the said corpuscular beam detector.

3. The radiation deep dose measuring apparatus as described in claim 1 wherein said moving means rotates said corpuscular beam detector and said image receiver by 360° about a center corresponding to an extension of a radial axis of the corpuscular beam, said corpuscular beam detector being positioned at one side of the radial axis.

4. The radiation deep dose measuring apparatus as described in claim 1 wherein said moving means moves said corpuscular beam detector and said image receiver together in parallel to at least one of a width and a thickness of said corpuscular beam detector.

5. The radiation deep dose measuring apparatus as described in claim 1 wherein said moving means moves said corpuscular beam detector and said image receiver together parallel to the corpuscular beam.

6. The radiation deep dose measuring apparatus as described in claim 1 including a reflecting member for reflecting light from said corpuscular beam detector onto said image receiver, thereby reducing separation between said corpuscular beam detector and said image receiver.

7. The radiation deep dose measuring apparatus as described in claim 1 wherein at least one of said corpuscular beam detector and said image receiver includes position adjustment means for adjusting separation of said corpuscular beam detector and said image receiver.

8. The radiation deep dose measuring apparatus as described in claim 1 wherein said corpuscular beam detector has radiation absorbing properties similar to biological tissues, and each of said scintillators includes a bundle of scintillation fibers.

9. The radiation deep dose measuring apparatus as described in claim 1 wherein said corpuscular beam detector comprises a main block including said array of scintillators sandwiched between transparent blocks having radiation absorbing properties similar to biological tissues.

10. The radiation deep dose measuring apparatus as described in claim 1 wherein the corpuscular beam detector comprises:
    a main block of a material having radiation absorbing properties similar to biological tissues and reflecting light, said block including a plurality of holes, each of said scintillators comprising a liquid scintillator having radiation absorbing properties similar to biological tissues and filling a corresponding one of the holes; and
    a transparent material having radiation absorbing properties similar to biological tissues covering the holes.

11. The corpuscular beam detector as described in claim 10 wherein said main block is located between transparent blocks having radiation absorbing properties similar to biological tissues.

12. The radiation deep dose measuring apparatus as described in claim 10 wherein said main block includes, on one side, a transparent block having radiation absorbing properties similar to biological tissues and, on another side, a reflective block having radiation absorbing properties similar to biological tissues and reflecting light.

13. The radiation deep dose measuring apparatus as described in claim 10 wherein said main block includes a plurality of block units in a grid pattern.

14. The radiation deep dose measuring apparatus as described in claim 1 wherein said corpuscular beam detector comprises a main block of a material having radiation absorbing properties similar to biological tissues and reflecting light, said block including a plurality of holes, and each of said scintillators comprises a plurality of scintillation fibers having radiation absorbing properties similar to biological tissues and disposed in a corresponding one of the holes.

\* \* \* \* \*